May 27, 1952 C. C. SHUMARD 2,598,312
SINE AND COSINE FUNCTION VOLTAGE DEVICE
Filed July 11, 1951

INVENTOR
Charles C. Shumard
BY
ATTORNEY

Patented May 27, 1952

2,598,312

UNITED STATES PATENT OFFICE 2,598,312

SINE AND COSINE FUNCTION VOLTAGE DEVICE

Charles C. Shumard, Hopewell, N. J., assignor to Radio Corporation of America, a corporation of Delaware Application July 11, 1951, Serial No. 236,168

5 Claims. (Cl. 235—61)

1

This invention relates to systems for producing voltages which are proportional to selected functions of an angle and more particularly to circuits for deriving voltages which are representative of the sine or cosine of an angle.

The presently known apparatuses for obtaining a voltage representative of the sine or cosine of an angle such as angle resolvers, sine wound potentiometers, or linear potentiometers with special cam drives, all function effectively but are difficult to manufacture and expensive to buy. Furthermore, many applications for these types of apparatuses exist where the high degree of accuracy provided by them is not required. In such cases their expense is not warranted.

It is an object of this invention to provide an improved and inexpensive circuit for providing a voltage which is representative of the sine or cosine of an angle.

It is a further object of this invention to provide an improved and novel circuit for providing a voltage which is representative of the sine or cosine of an angle.

It is still a further object of this invention to provide an improved and simple circuit for providing a voltage which is representative of the sine or cosine of an angle.

It is still a further object of this invention to provide an improved and simple circuit for providing a voltage which is representative of the sine or cosine of an angle which uses only linear wound potentiometers and resistors.

These and further objects of the present invention are obtained by using a linear wound potentiometer, which is shorted, in combination with a second linear wound potentiometer having its slider mechanically ganged to the slider of the shorted potentiometer and having a resistor in series with its slider and another resistor in shunt with its winding. A number of inter-connected resistors are provided to provide proper attenuation and further compensation for the output characteristics of the second potentiometer. The output, which is derived from the slider of the second potentiometer, varies in accordance with the sine or cosine function of the angle of rotation of the shafts of the ganged potentiometers if the total potentiometer rotation is considered as equivalent to 90 degrees.

The novel features of the invention, as well as the invention itself, both as to its organization and method of operation, will best be understood from the following description, when read in connection with the accompanying drawing, in which,

2

Figure 1:
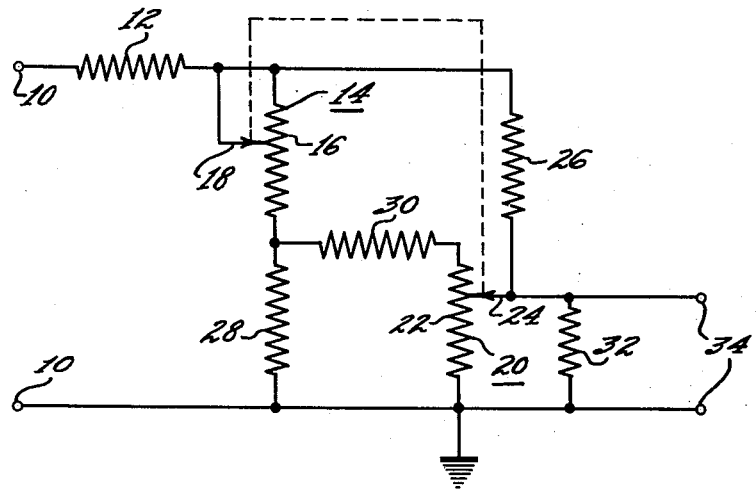
Figure 1 is a circuit diagram of an embodiment of the invention.

Reference is now made to Figure 1 where a circuit diagram of an embodiment of the invention is shown. Input voltage is applied to a pair of input terminals 10. A first resistor 12 is connected from one of the input terminals 10 to one end of the winding 16 of a first potentiometer 14. This first potentiometer 14 has a linear winding and has its slider arm 18 connected to the end to which the first resistor 12 is connected, thus constituting a variable short for the potentiometer winding 16. A second potentiometer 20, also having a linear winding 22, has its slider 24 mechanically ganged with the slider 18 of the first potentiometer 14 to be jointly movable therewith. A second resistor 26 is connected from the one end of the first potentiometer winding 16 to the slider 24 of the second potentiometer 20. A third resistor 28 is connected between the other end of the first potentiometer winding 16 and the other of said input terminals 10. A fourth resistor 30 is connected between the other end of the first potentiometer winding and one end of the second potentiometer winding 22. A fifth or load resistor 32 is connected from the slider 24 of the second potentiometer to the other end of the second potentiometer winding. Output terminals 34 are connected to the ends of the fifth resistor 32. It will also be noted that one of the output terminals 34 is directly connected to the one of the input terminals 10 which is also connected to (1) the third resistor 28 and (2) the other end of said second potentiometer winding.

The second potentiometer 14 and the associated resistors serve to attenuate and correct the shape of the output from the potentiometer 20. The output normally derived from a shorted potentiometer with a resistor in series with its slider is a parabolic function with rotation. By inserting a resistor having a judiciously selected value, in shunt with the potentiometer winding, in place of the short circuit the output derived from the potentiometer, with rotation, is approximately a quarter sine wave, considering the full rotation of the potentiometer as 90 degrees. This potentiometer and its resistors correspond to the second potentiometer 20 and resistors 28 and 30. The first potentiometer 14 which is shorted, and resistors 12 and 26 are added to further correct and shape the output from the second potentiometer. The load resistor 32 was added also.

It was also determined that the greater the allowable attenuation the closer the output from the second potentiometer resembled a sine wave. Establishing however that the transmission should be 20% it was determined that the ratio of the first to the second potentiometer should be 0.05 to 1.0. In accordance with good D. C. amplifier practice the external load resistor 32 was then selected as 10 times the reference or second potentiometer value. It was then experimentally determined that the ratio of the second resistor 26 to the reference potentiometer 20 should be 0.3; likewise the ratio of the third resistor 28 should be 0.007, the fourth resistor 30 should be 0.422, and the first resistor 12 should be 0.0822 in order to obtain a minimum error.

Figure 2:
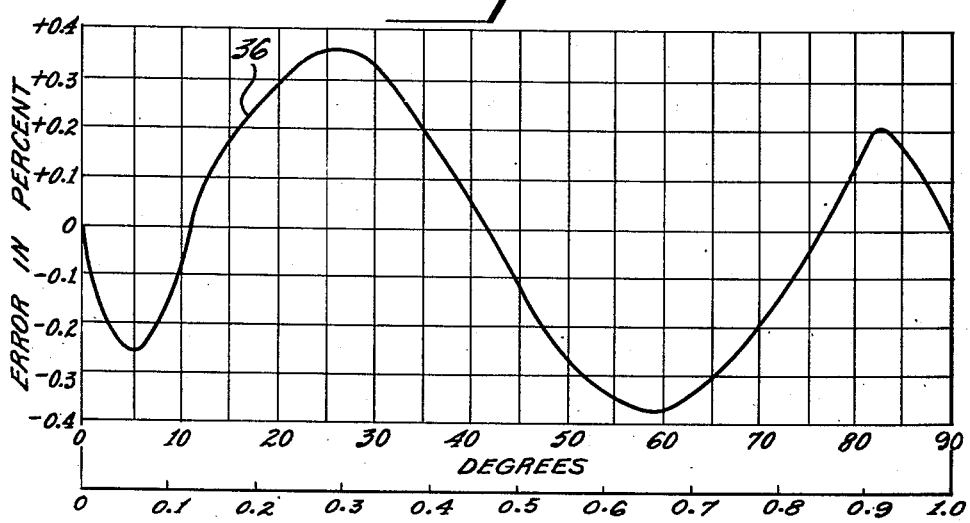
Figure 2 is a curve showing the deviation from a true sine function of the subject embodiment of the invention.

Figure 2 shows the curve 36 of the percentage error variation from a true sine wave over the range of 90 degrees. It can be seen from the curve 36 that this deviation is a very small one and permits use of the circuit where higher degrees of accuracy are not required. The values of the circuit components selected in accordance with the above information to obtain a 20% transmission and to be readily commercially obtainable are as follows:

First resistor 12 _____ 882 ohms
Second resistor 26 _____ 5,000 ohms
Third resistor 28 _____ 700 ohms
Fourth resistor 30 _____ 42,300 ohms
Fifth resistor 32 _____ 100,000 ohms, linear
First potentiometer 14 _____ 5,000 ohms, linear wound potentiometer
Second potentiometer 20 ____ 100,000 ohms, linear wound potentiometer For any steady voltage applied to the input terminals 10 an output voltage is obtained at the output terminals 34 which, is a sine function of the angle of rotation of the potentiometer ganged sliding arms 16 and 24, considering the entire potentiometer rotation as 90 degrees.

The network is useable to provide either a sine or cosine function since, as is well-known, the sine function of an angle is also the cosine function of the complement of that angle. By properly reversing the polarity of the voltage connections the operation of the system shown may be extended to the region between 180 and 360 degrees.

There has been shown and described herein a simple and inexpensive circuit for providing voltages which are sine or cosine functions of an angle. The circuit is made of inexpensive commercially available components including two linear wound potentiometers.

What is claimed is:

1. A circuit for deriving a voltage which represents a function of either a sine or a cosine of an angle comprising a pair of voltage input terminals, a first resistor having one end connected to one of said input terminals, a second resistor, a first potentiometer, one end of said second resistor and said first potentiometer winding being connected to the other end of said first resistor, said first potentiometer slider being connected to said other end of said first resistor, a third and a fourth resistor having one of their ends connected to the other end of said first potentiometer winding, a second potentiometer having one end of its winding connected to the other end of said 4th resistor, the slider of said potentiometer being connected to the other end of said second resistor, said first and second potentiometers having their sliders mechanically ganged to be simultaneously movable, a fifth resistor having one end connected to said potentiometer slider, and a pair of output terminals, one of which is connected to said potentiometer slider and the other of which is connected to the other ends of said third resistor, said fifth resistor and said potentiometer winding, and to the other of said input terminals.

2. A circuit as recited in claim 1 wherein said first and second potentiometers have linear windings.

3. A circuit as recited in claim 1 wherein the values of said circuit components are all determined based on the value of said second potentiometer winding, said first resistor being in the ratio of 0.0882, said second resistor being in the ratio of 0.3, said third resistor being in the ratio of 0.007, said fourth resistor being in the ratio of 0.422, said fifth resistor being in the ratio of 10 and said first potentiometer being in the ratio of 0.05.

4. A circuit as recited in claim 1, wherein the values of said circuit components are selected to provide a maximum transmission of 20 percent of the input voltage.

5. A circuit for deriving a voltage which represents a function of either a sine or cosine of an angle comprising a pair of voltage input terminals, a first and a second linear potentiometer having their slider arms ganged to be simultaneously movable, said first potentiometer winding having a resistance value substantially 0.05 that of said second potentiometer winding, said first potentiometer having its slider arm connected to one end of its winding, a first resistor connected between said last named winding one end and one of said input terminals, said first resistor having a resistance value 0.0882 that of said second potentiometer winding, a second resistor connected between said last named winding one end and the slider of said second potentiometer, said second resistor having a value 0.3 of that of said second potentiometer winding, a third resistor connected between the other end of said first potentiometer winding and one end of said second potentiometer winding, said third resistor having a resistance value of substantially 0.007 of that of said second potentiometer winding, a fourth resistor connected between the other end of said first potentiometer winding and the other end of said second potentiometer winding, said fourth resistor having a resistance value of 0.422 of that of said second potentiometer winding, a fifth resistor connected between said second potentiometer sliding arm and the other end of said second potentiometer winding, said fifth resistor having a value at least ten times the value of said second potentiometer winding, and a pair of output terminals connected to the ends of said fifth resistor and to the other one of said input terminal.

CHARLES C. SHUMARD.

The following references are of record in the file of this patent:

UNITED STATES PATENTS

| Number | Name | Date |
| --- | --- | --- |
| 2,507,890 | Crowther | May 16, 1950 |

OTHER REFERENCES

"Electronic Instruments," Greenwood, Holdam and MacRae, pp. 93–104; McGraw-Hill, New York, 1948.